(12) United States Patent
Beck

(10) Patent No.: US 9,348,675 B2
(45) Date of Patent: May 24, 2016

(54) ACTIVE SERVICE BUS

(71) Applicant: Richard Beck, Rockville Centre, NY (US)

(72) Inventor: Richard Beck, Rockville Centre, NY (US)

(73) Assignee: Information Builders, Inc., New York, NY (US)

( * ) Notice: Subject to any disclaimer, the term of this patent is extended or adjusted under 35 U.S.C. 154(b) by 610 days.

(21) Appl. No.: 13/915,216

(22) Filed: Jun. 11, 2013

(65) Prior Publication Data

US 2014/0244832 A1   Aug. 28, 2014

Related U.S. Application Data

(60) Provisional application No. 61/769,578, filed on Feb. 26, 2013.

(51) Int. Cl.
| | | |
|---|---|---|
| *G06F 15/173* | (2006.01) | |
| *G06F 9/54* | (2006.01) | |
| *H04L 12/863* | (2013.01) | |
| *H04L 12/867* | (2013.01) | |
| *H04L 12/875* | (2013.01) | |
| *H04L 12/865* | (2013.01) | |
| *H04L 12/869* | (2013.01) | |

(52) U.S. Cl.
CPC ............... *G06F 9/546* (2013.01); *G06F 9/544* (2013.01); *H04L 47/50* (2013.01); *H04L 47/56* (2013.01); *H04L 47/60* (2013.01); *H04L 47/622* (2013.01); *H04L 47/6205* (2013.01); *H04L 47/629* (2013.01); *H04L 47/6225* (2013.01); *H04L 47/6235* (2013.01); *H04L 47/6245* (2013.01); *H04L 47/6255* (2013.01); *H04L 47/6265* (2013.01); *H04L 47/6275* (2013.01); *H04L 47/6295* (2013.01)

(58) Field of Classification Search
CPC ......... H04L 47/50; H04L 47/56; H04L 47/60; H04L 47/6205; H04L 47/622; H04L 47/6225; H04L 47/623; H04L 47/6235; H04L 47/6245; H04L 47/6255; H04L 47/6265; H04L 47/6275; H04L 47/629; H04L 47/6295; G06F 9/546; G06F 9/544
See application file for complete search history.

(56) References Cited

U.S. PATENT DOCUMENTS

| | | | | |
|---|---|---|---|---|
| 8,516,146 | B1 * | 8/2013 | Yen | H04L 67/16 709/201 |
| 2002/0178210 | A1 * | 11/2002 | Khare | G06F 12/0831 718/107 |
| 2008/0148275 | A1 * | 6/2008 | Krits | G06F 9/542 719/313 |
| 2011/0153713 | A1 * | 6/2011 | Yurkovich | G06F 9/546 709/202 |

* cited by examiner

*Primary Examiner* — Richard G Keehn
*Assistant Examiner* — Mohammed Ahmed
(74) *Attorney, Agent, or Firm* — Levine Mandelbaum PLLC

(57) ABSTRACT

A method of responding to random service request messages received on an enterprise service bus of a computer network, each of said messages being a member of a group of related messages, in which the received messages are stored in a queue when detected by a listener for processing in a process flow having one or more nodes connected by respective edges between the listener and an emitter. In immediate mode, a message is accepted for processing only when a node is available and no other message in the same group is being processed. In batch mode, all of the messages in a group must be present in the queue before the messages in the group can be processed in predetermined order.

16 Claims, 14 Drawing Sheets

$D_3\ F_4\ C_2\ B_1\ A_3\ E_3\ A_1\ C_1\ C_3\ A_4\ G_2\ F_1\ A_2\ B_3\ G_1\ E_2\ B_2\ D_4\ G_4\ B_4\ F_2\ D_1\ D_2\ G_3\ E_4\ C_4\ F_3\ E_1$

ACTIVE SERVICE BUS

BACKGROUND OF THE INVENTION

It is known in an enterprise to employ computer systems for receiving messages indicative of requests to be processed as input and processing the messages, either individually or in combination with other messages, to execute the requests.

It is also known to employ a service bus engine wherein input from the "outside world" is transformed in some manner to a representation tailored to a particular purpose. That is, the standard input->process-> output. Such a service bus engine is commercially available under the service mark IWAY from Information Builders, Inc. of New York, N.Y.

The prior art service manager is a software execution system of the class Enterprise Service Bus. In such architecture, the logic of the application is encapsulated in nodes, or small software programs, that are linked together on the bus. The bus forms the connection between the nodes, often in the form of a directed graph. In a directed graph, the nodes are represented by circles and the bus by the lines, referred to as "edges" leading to and from the nodes.

A message is inserted onto the bus and it travels from node to node, each node contributing one stage to the processing needed for the message.

In enterprise service bus systems, the bus is architecturally passive serving only to link the nodes, one to the other. The edges which form the bus are often constructed in software and are "dumb" in that they only serve as paths between the nodes, i.e., they forward the output of one node to the input of the next node.

SUMMARY OF THE INVENTION

The present invention overcomes the shortcomings of the prior art by providing a method of responding to random service request messages received on an enterprise service bus of a computer network, each of said messages being a member of a group of related messages through the creation of an intelligent or ordering queue to alleviate the need to single thread and sort arrivals by automatically segregating and ordering within groups of related messages.

At least one channel is constructed with a listener for detecting messages connected by an edge to an input of parallel nodes provided for processing messages simultaneously, and an emitter connected by another edge to an output of the parallel nodes for transmitting each processed message to another channel or an output device. The nodes accept messages which arrive in a queue at the listener for processing only when no other message in a group of mutually dependent messages is being processed in a similar node.

A queuelet with a filtered view of only the messages in a single group of mutually dependent messages is created whenever a first unprocessed message arrives in the queue and dissolved when there are no unprocessed message in the queue and the last message taken from the queue has finished execution, i.e., has completed processing. A dispatch list register receives a token corresponding to a batch key for each queuelet when there is an unprocessed message in the queuelet and no other message in the group corresponding to the batch key of the queuelet is being processed. Nodes which are or become free for processing a message accept the next message in the queuelet indicated by the first received batch key token in the dispatch list register and that batch key token is then deleted from the dispatch list register.

When the order in which the messages in a group of related messages is processed is inconsequential, the method of the invention can be performed in immediate mode. That is, whenever a candidate message is present in a queuelet, a node is free to process the message, and there is no other message belonging to the group to which the candidate message belongs, the candidate message may be accepted for processing.

When the order in which the messages in a group of related messages is processed is consequential, the method of the invention is performed in batch mode. That is, a candidate message present in a queuelet may only be processed after all of the messages of its group have been received in the queuelet. This condition permits the messages in the queuelet to be sorted for processing in predetermined order. As in immediate mode, a node must be free to process a message, and there must be no other message belonging to the group to which the candidate message belongs, before the candidate message may be accepted for processing.

It is therefore an object of the invention to provide an active enterprise service bus of a computer network to perform common basic functions thereby minimizing system development effort and expense.

Another object of the invention is to provide an active enterprise service bus of a computer network having one or more channels with a process flow connected by an intelligent edge to a listener where request messages are received and another intelligent edge connecting an emitter to the process flow from where processed messages are passed to another channel or to an output device.

A further object of the invention is to provide an active enterprise service bus of a computer network having one or more channels with parallel process flows for performing like processes on multiple independent messages simultaneously while preventing simultaneous processing of mutually dependent messages.

Still a further object of the invention is to provide an active enterprise service bus of a computer network where randomly received messages can be distributed to parallel process flows with maximum efficiency.

An additional object of the invention is to provide an active enterprise service bus of a computer network where processing of grouped messages takes place uniformly among all groups having messages ready for processing.

Other and further objects of the invention will be apparent from the following description and drawings of preferred embodiments of the invention.

DESCRIPTION OF THE PREFERRED EMBODIMENTS

Figure 1:
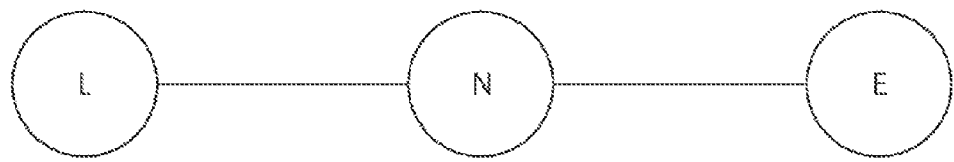
FIG. 1 is a logic diagram for a prior art method of responding to random service request messages received on an enterprise service bus of a computer network.
Figure 2:
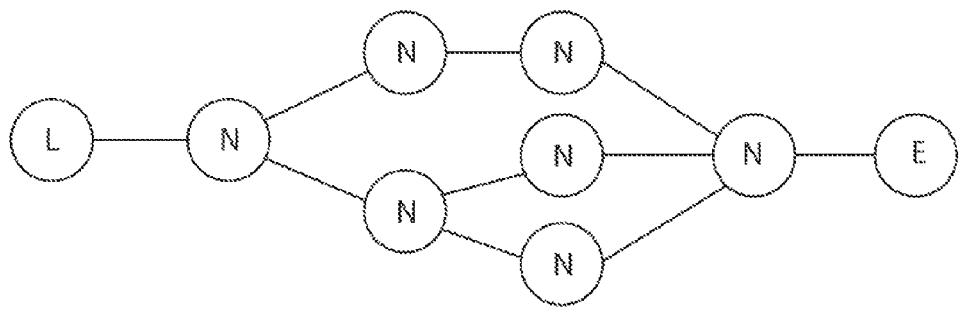
FIG. 2 is a logic diagram for another prior art method of responding to random service request messages received on an enterprise service bus of a computer network.

Referring to FIG. 1 of the drawings, a bus service engine or service manager consists of one or more channels each of which has three main parts—a "listener" L that receives messages from some external media, e.g., a disk, an action on the Internet, or a message on a queue. The appropriate listener passes the message to a "process flow". The process flow consists of one or more nodes N, each of which applies small software programs, sometimes illustrated as intermediate nodes on a direction graph, one after the other, to examine, transform and otherwise manipulate the message. The process flow nodes may be connected in series, or in parallel to form branches which may be connected to other branches in series, or in parallel, an example being shown in FIG. 2.

The result of the processing is then sent to an "emitter" component that sends the message to a different venue, such as another channel, onto the Internet, to the input of a database, etc.

Exactly what processing is performed and the ultimate destination is determined by an application designer/builder sometimes herein referred to as a programmer. The process flow consists of nodes which are connected by "edges" on a directed graph. This approach is universal to applications and can meet virtually all application requirements.

Frequently an application consists not of a single channel (listener, process flow and emitter) but multiple channels, each performing a stage of the application. For example, the first channel might receive the message and format it, then pass it to a second channel to do routing, and then on to a third channel to send it to its ultimate destination. A message in error might be emitted to an error channel that deals only with error situations, freeing the other components from each having to deal with errors at every stage. The linkage between the first and subsequent channels is an "internal queue", and the prior art service manager offers listeners and emitters that put messages onto and take messages off the internal queue.

Prior art service bus managers employ queue's characterized by "first come, first served" i.e., FIFO, behavior.

In a multithreaded system used to achieve high performance it is possible to process many messages in parallel. In some applications, the order in which the messages are processed is important. To accomplish strict ordering in the existing first come first served channel a single processing thread must be used to avoid scrambling the order of the messages; facilities for retry and recovery must also be restricted as they too can scramble the messages on the queue. These artificial restrictions have severe impact on performance and require, in many cases, the application programmer to write messages to a database in one part of the application and read it back in another.

Some of the constraints are severe and costly in terms of both system execution and programmer development time. It is not always possible to predict the order in which messages arrive from outside—e.g. messages received from the Internet cannot be ordered so the application programmer must create computer programs to store, sort and execute the messages.

According to the invention, unlike the prior art, the bus in the service manager ceases to be totally architecturally passive and can itself implement common application logic, freeing the programmer (who defines the order of the nodes to accomplish the purpose of an application) to concentrate on application design in a simpler manner since services are made available and ready to be performed automatically between the nodes. Thus the service bus, as implemented in the invention, is an active service bus.

An example of active services is sorting and grouping of messages as the messages travel from node to node. The application programmer simply instructs the bus on the receipt characteristic of the messages, freeing the designer/programmer from concern with overly common, technical and often difficult parts of the application.

As implemented, the intelligent edges that execute ordering and ordered release of information, are facilities of the bus service manager. In the bus server, interchannel edges are called listeners, i.e., they listen for and respond to an event by dispatching a message to the first or next execution node in the application. Listeners can also acquire messages from outside media. In the case of unordered and ordered queue edges, each event is a message ready for dispatch. Messages received by or through any specific listener are executed by a local directed graph called a process flow. The totality of process flows constitutes the application which can be modeled as a larger scope directed graph.

The implementation described herein represents the intelligent edge and the passage of a message onto the edge as specific server services. A graphic user interface (GUI) could hide the specific implementation from an application designer; however the operation of the edge would not change.

Each listener/edge is configured with values appropriate to the application running on the system. For the ordered queue listener the key values are:

Throttle values to control performance within the queue and server as a whole.
  Low water mark tracks the size of the queue as a whole.
  High water mark tracks the size of the queue as a whole.
  Channel names to be controlled based on the queue size at any instant.
  Queue control method determines the specific throttle algorithm in use.
Ordering values describe how the edge performs sorting
  Mode, immediate or batching
  Subsort type (chronological, lexical or numeric)
Persistence values describe how persistence of messages is accomplished (to a file or database.)

Edges accept messages when a message leaves the prior node. As implemented, the entry to the ordered listener/edge is coded as a visible emit node that passes the message to the ordered listener. A GUI change can simplify use by associating the values needed with an edge within the local directed graph.

Terms used herein are defined as follows.
Process: Runs on a channel, consisting of nodes and edges.
Application: One or more processes that together accomplish some overall purpose.
Message: Information upon which a process works. The message changes state as it passes through a process.
Register: A variable holding either an internal (invisible) server value or a user value.
Context: The set of registers associated with the current message.
Marshal: Collection of the message and its context. The marshal operation prepares the message to pass along an edge (in the current implementation between channels.) Marshalled messages can be encrypted and/or compressed. A marshalled message can be reconstructed by a reverse unmarshal operation.
Passivation: A state in which a queue signals other channels that it is "too full" and expects those channels to cease acquiring messages.
Inhibition: A state in which a queue rejects incoming messages.
Listener/edges can be local (within the same server instance) or communicating (across an IP link.) Only local listener/edges offer ordering, but the receiving side of a communicating listener/edge can pass a message within its own process flow to a listener/edge to accomplish the same application design. Extension of ordering directly to a communicating edge can be achieved by adapting a GUI accordingly.

Emitting to the edge/queue.

Emit a Message to the Ordered Queue

1. If configured for subsorting, extract the sort key in lexical form and load into a pre-named register (sortkey.) For lexical or numeric keys, the value is taken from the message or context via internal script specification (XPath, register value, etc.) For chronological sorting, the current timestamp is loaded into the key.
2. Extract the batch ID and load it into a pre-named register (batch key.) The value is taken from the message or context via internal script specification (XPATH, register value, etc.)
3. Marshal the message.
4. Add the message to the edge's queue.
5. If the add operation fails, raise an error.

Otherwise the operation is complete.

Emit a control message to the ordered queue.

In batch mode every member of a group must enter the internal queue at a listener L before processing of the messages in the group can begin. In immediate mode processing can begin before all messages are received. Control messages apply only to batch mode, and not to immediate mode queues. Control messages are small signals passed to the queue handler.

1. Extract the batch ID and load it into a pre-named register (batch key.) The value is taken from the message or context via internal script specification (XPATH, register value, etc.)
2. Marshal the message.
3. Add the message to the edge's queue.
4. Depending on the state of the queue, the following conditions are returned to the emitter.
a. Available and the message is accepted. This is a success.
b. Inhibited. The queue cannot accept messages (see below.) The emitter retries for a configurable period, and if the condition persists, a timeout error is raised.
c. If the queue is invalid or in error state, an error is raised.

Listener/Edge queue algorithms.

The edge queue is implemented as a map of lists, called batchmap. The map is a standard key=value map, with key being the batch key and the value being a list of marshaled messages.

A dispatch token list is maintained by the queue. A dispatch token contains only the batch key. Dispatch tokens designate work available to be performed. Each batchmap key (batch key) is given an associated dispatch token. The list has two parts, tokens awaiting dispatch and tokens in execution. Together these two parts, unless otherwise distinguished, constitute the dispatch token list.

Listener/Edge Queue States

States change as the queue size changes. Size means the number of messages currently in the queue. An event is triggered by a message arriving at the queue for an add operation. See Table 1 below.

TABLE 1

| State | Event | Transition | Explanation/Action |
|---|---|---|---|
| ACTIVE | Low mark < size < high mark | ACTIVE | Accept another message |
| ACTIVE | Size > high mark | Passivate configured: PASSIVE | Accept message, send passivate message to configured channels |
| ACTIVE | Size > high mark | Inhibit configured: INHIBIT | Reject message |
| ACTIVE | Size < low mark | ACTIVE | Msg executed, reducing queue |
| PASSIVE | Size >= low mark | PASSIVE | Accept message |
| PASSIVE | Size < low mark | ACTIVE | Accept message, send activate (unpassivate) message to configured channels |
| INHIBIT | Size >= low mark | INHIBIT | Reject message |
| INHIBIT | Size > low mark | ACTIVE | Accept message |
| START | Add one message | ACTIVE | Begin operation |

Receipt of an Added Message

1. If the queue is persistent, the marshaled message is written to the persistence storage.
a. If the message exists in the persistence storage (by message id) do not write (see STARTUP process)
b. If it does not exist, add it.
2. Enter "synchronized" mode to prevent clashes in the internal maps and structures. Steps 3-6 are synchronized.
3. Search batchmap for the batch key.
 a. If present, return the list of messages in the batch.
 b. If not present, add the batch key with an empty list to the map. Return the new, empty list.
4. Add the marshaled message reference to the list.
5. If the listener is configured as "immediate", construct a dispatch token. If the token does not already exist, add it to the dispatch token list. Only a single dispatch token for a batch key can exist in the dispatch token list.
6. If the listener is configured as "batch", take no further action. The remaining action awaits arrival of a control message from the emitter. Note that a batch key may currently be in the dispatch list. This is not the same batch, as only a closed batch can be in the dispatch list.
7. If the size of the queue exceeds the configured high water mark perform throttling action Enter HOLD state. This can be configured as:
a. Passivate. A "passivate" message is dispatched to all channels named in the control list. A passivated channel temporarily stops acquisition of messages. This prevents new marshaled messages from reaching the queue. Messages continue to be dispatched from the queue, reducing its size.
b. Inhibit. Channels in the list are not directly addressed. Instead the emit to the ordered queue (edge) is prevented and an error is returned.
8. If in HOLD state and the size of the queue is lower than the low water mark
a. Take action to reactivate the passivated channels or remove the inhibit state from the queue.
b. Enter ACTIVE state.

Receipt of a Control Message

1. If "cancel", perform the following steps
a. Search batchmap for a key of the batch key.
 If present, return the list of messages in the batch.
b. If not present, cancel has no effect.
c. Delete the batch key from the batchmap.
2. If "release" perform the following steps
a. Search batchmap for a key of the batch key.
 If present, return the list of messages in the batch.
b. If not present, release has no effect.

c. Sort the batch by sortkey. Depending upon the sortkey type configured, perform an appropriate comparison for the sort.

d. Construct a dispatch token. Only a single dispatch token for a batch key can exist in the dispatch token list. Add the dispatch token to the list.

Dispatch to the Next Execution Node

1. Enter "synchronized" mode. Steps 2-3 are synchronized.
2. Extract the dispatch token from the head of the dispatch token list.
3. If the list is empty, i.e., there are no further messages for this batch key, delete the key from the batchmap.
4. On exit from the process flow, delete the message from the persistence store if present.

Startup of an Internal/Ordering Edge With Existing Messages Outstanding

Startup is triggered when the listener first begins operation. The startup begins in state START.
1. Create internal queue structures.
2. Enter ACTIVE state.
3. If not persistent, exit startup operations.
4. Read each marshaled message in the persistence store and emit to the main queue.

Other facilities implemented in the intelligent edges are:
1. Communications which allow the transfer of the marshaled message across an IP link.
2. Tracing which allows formatting for debuggers and serialization of the message to external media.

Other services can easily be foreseen.

Figure 3:
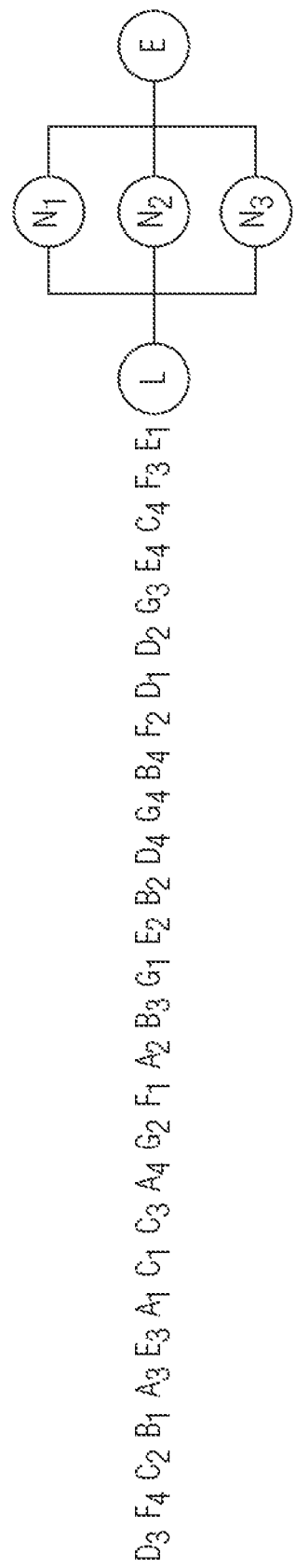
FIG. 3 is a logic diagram for a method of responding to random service request messages received on an enterprise service bus of a computer network in accordance with the invention.

Referring now to FIG. 3 of the drawings there is shown a logical diagram of an enterprise service bus with a channel having a listener L which receives messages, i.e., requests, for processing by one of three identical nodes $N_2$, $N_2$, and $N_3$ of a process flow. The nodes $N_2$, $N_2$, and $N_3$ accept messages from the listener L and upon completion of processing forward the processed messages to an emitter E for transmission to another channel for further processing or to an output device when processing is complete.

In the example of FIG. 3, multi threading is used whereby the process flow includes three identical nodes $N_1$, $N_2$, and $N_3$. In prior art enterprise service busses, the programmer of the process flow nodes $N_1$, $N_2$, and $N_3$ has no knowledge of the order in which messages will be received from the listener L. Where all messages are independent of one another, the programmer can merely accept each message, assign it to a process flow $N_1$, $N_2$, or $N_3$, and transmit the result of the processed message to the emitter E. However, in situations where there is a relationship among the messages, e.g., which may require that the messages be processed in a predetermined order, the programmer must write code to compare each message with rules which must also be programmed, and then provide for when and where each message may be processed.

In the example of FIG. 3, seven groups of messages, A, B, C, D, E, F, and G are provided. Each group has four members, e.g., $A_1$, $A_2$, $A_3$ and $A_4$. For example in an application where packages are to be loaded on trucks at a warehouse depot, the groups may correspond to trucks represented by the letters A-G respectively. The members of each group could be containers which arrive on a conveyor in random sequence and are to be loaded onto a designated truck.

In the example of FIG. 3, the containers would be identified by a group letter, e.g., A, representing the truck on which the container is to be loaded, and a subscript indicating a parameter which determines the order in which the containers are to be loaded onto each truck. That is, subscript 1 may indicate the largest volume in an application which the largest container is the first to be loaded. That is containers $A_1$, $A_2$, $A_3$ and $A_4$ are to be loaded onto truck A. Containers $B_2$, $B_2$, $B_3$ and $B_4$ are destined for truck B, and so on.

If the containers are to be loaded in the order of their volume, i.e., the largest volume container is to be loaded first followed by the next largest, then the next largest, and finally the smallest of the containers, then container $A_1$ must be loaded onto truck A, followed by container $A_2$, then container $A_3$ and finally container $A_4$.

First consider the case where the containers must be loaded on the trucks for which they are destined but the order of loading does not matter. In such a situation, the enterprise bus server of the invention would operate in immediate mode. That is, each time a package is delivered on the conveyor it can be loaded onto the truck to which it corresponds without waiting for any other container assigned to the same truck. However, only one container can be loaded on a specific truck at a time. Hence if a container destined for a specific truck arrives while another container is being loaded onto that truck, that container must wait until loading of the earlier received container is completed.

Figure 4A:
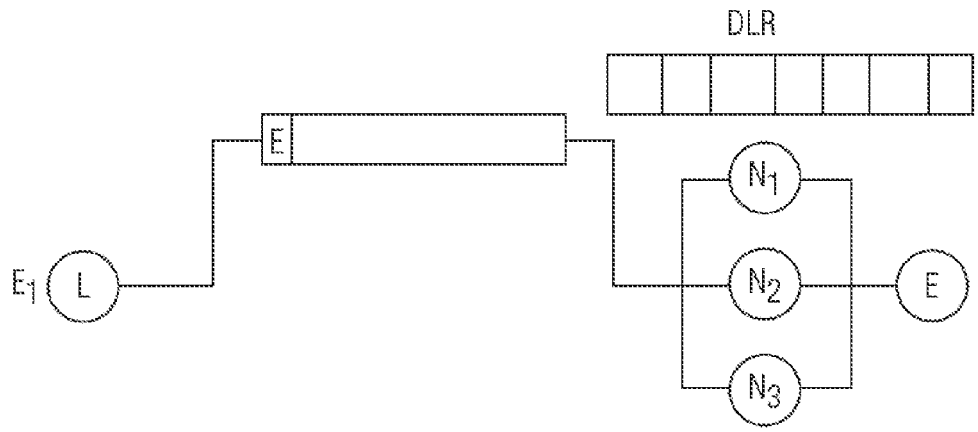
FIGS. 4A-4O are logic diagrams illustrating various sequential step of the method of FIG. 3 in accordance with a first embodiment of the invention.

Referring now to FIG. 4A, tokens of a dispatch token list which represent messages waiting to be processed are entered into a dispatch list register DLR. The dispatch list register DLR receives a batch key that serves as a dispatch token when a group corresponding to the batch key is available for processing of a message, e.g., when a truck is available for processing a request to load a container onto the truck. As soon as a message is detected at the listener L a queuelet is created in the form of an empty container for a view of messages destined for the group to which the message belongs. In the present example the first message is $E_1$ and is a member of group E. Each queuelet contains a filtered and, in batch mode as discussed later, sorted view of the message queue received at the listener L. That is, each queuelet that is created at the edge between the listener L and the process flow nodes $N_1$, $N_2$, and $N_3$, has a view filtered to show only the received messages, e.g., containers, belonging to the group, e.g., truck, identified by the batch key of the queuelet.

The most recent message to arrive in the queue at the listener becomes a candidate message for acceptance by and entry into the process flow. Each time a message is rejected for processing due to the presence of a message from the same group undergoing processing in the process flow, the next message in the queue becomes the candidate message.

As the first message $E_1$ arrives, which in the example would be a request to load container $E_1$ onto truck E, a queuelet identified by batch key E is created for presenting a view of the messages belonging to group E which have been received at listener L. The first message $E_1$ becomes the candidate message, i.e., a candidate for processing in the process flow.

In immediate mode, as presently discussed, the queuelet need not present a sorted view of the messages corresponding to the batch key of the queuelet.

Figure 4B:
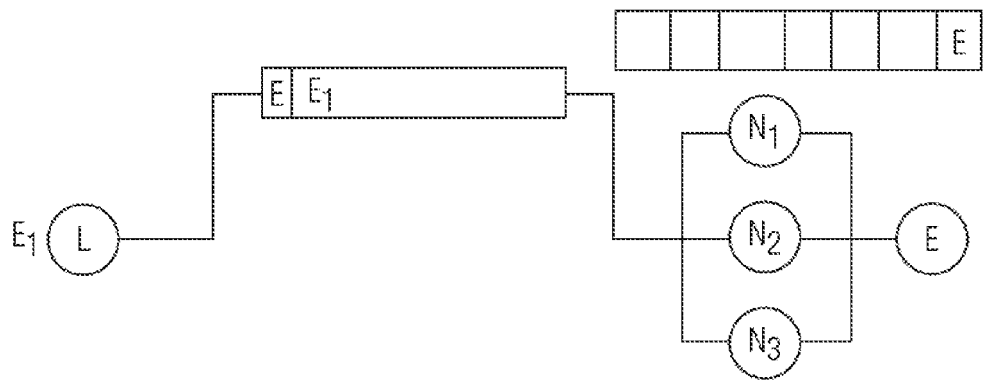

Referring now to FIG. 4B of the drawings, once the queuelet E has been created, the message $E_1$ is added to the view of queuelet identified by batch key E. At the same time, the process flow nodes $N_1$, $N_2$, and $N_3$, are checked to see if any message for group E is being processed. Upon finding no processing of a message for group E, the dispatch list register DLR is loaded with batch key E, i.e., the batch key of the queuelet E to indicate that there is a message on the queue of messages received at listener L that belongs to group E and is ready for processing by one of the process flow nodes $N_1$, $N_2$, and $N_3$.

Figure 4C:
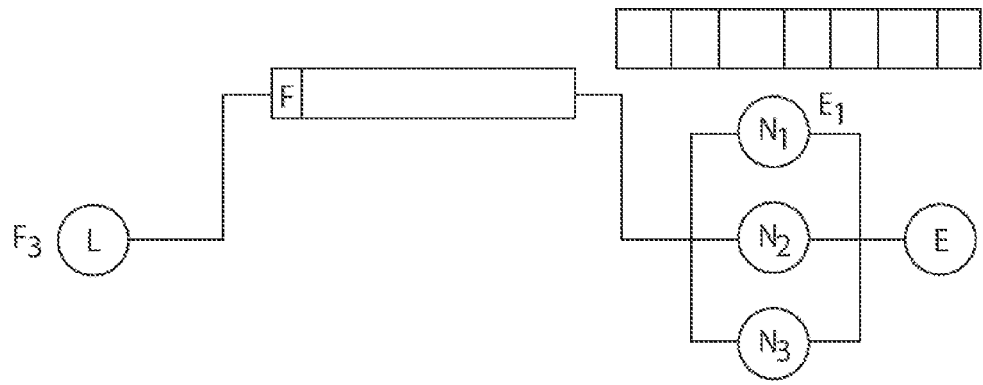

Referring now to FIG. 4C, process flow node $N_1$ has checked the dispatch list register DLR and found that there is a message in the view of queuelet E waiting to be processed.

The process flow $N_1$ therefore accepts the message $E_1$ from the queue for processing, and the message $E_1$ is removed from the view of queuelet E. Since there is no other message in the view of queuelet E, queuelet E is dissolved to be recreated only when another message which is a member of group E is received at the listener.

Meanwhile, still referring to FIG. 4C, message $F_3$ has arrived in the queue at the listener L. Accordingly, a new queuelet identified by batch key F has been created. At this time there is no view in queuelet F of a message ready for processing and the dispatch list register DLR remains empty.

Figure 4D:
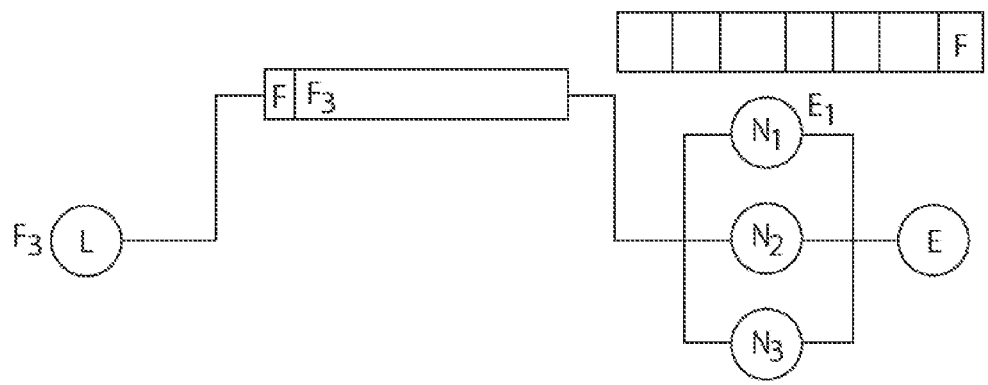

Referring now to FIG. 4D, message $F_3$ has been added to the view of queuelet F. Concurrently, since queuelet F is no longer empty, and no message corresponding to group F is currently being processed in any of the process flow nodes $N_1$, $N_2$, and $N_3$, batch key F is entered into the dispatch list register DLR to indicate that there is a message in the view of queuelet F available and ready to be processed. As can further be seen in FIG. 4D, at this time, message $E_1$ is still being processed in process flow N.

Figure 4E:
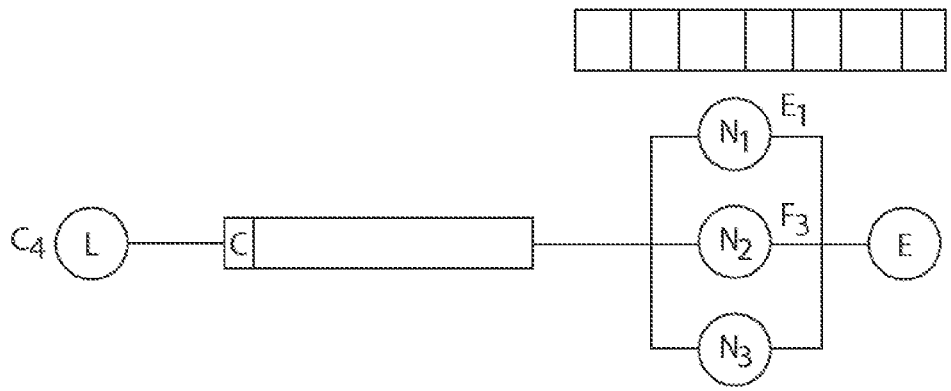

Referring now to FIG. 4E, message $F_3$ has been assigned to process flow $N_2$ for processing and since there are no other messages corresponding to group F in the view of queuelet F, queuelet F has been dissolved. Also batch key F no longer appears anywhere in the dispatch list register DLR since there are no messages corresponding to group F available for processing. At this time message $C_4$ has arrived and entered the queue at the listener L. In response to the arrival of message $C_4$, the empty queuelet C has been created. Meanwhile messages $E_1$ and $F_3$ are being processed by process flows $N_1$, and $N_2$ respectively.

Figure 4F:
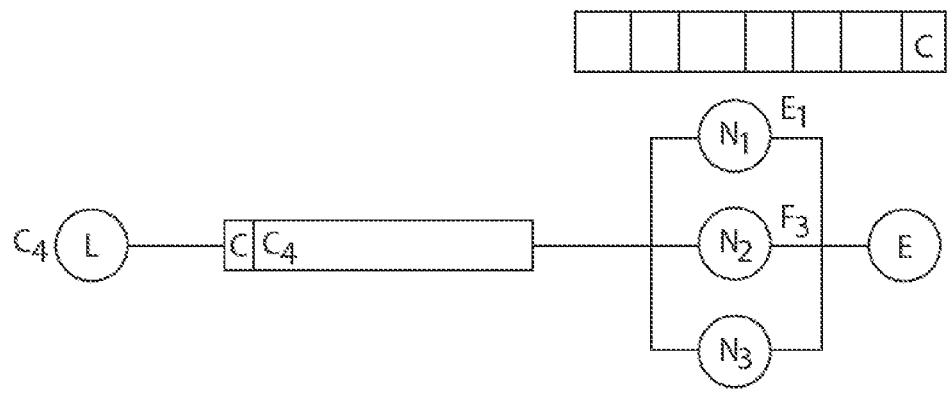

Referring now to FIG. 4F, after creation of queuelet C, its view has been made to include message $C_4$. Also since the contents of queuelet C are no longer empty and there is a message available for processing, batch key C is entered into the dispatch list register DLR. Messages $E_1$ and $F_3$ are still being processed by nodes $N_1$ and $N_2$ respectively.

Figure 4G:
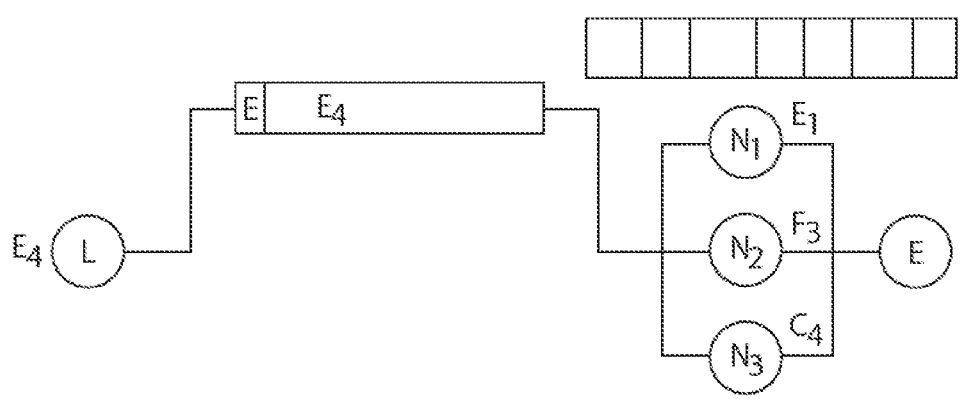

Referring now to FIG. 4G, message $C_4$ has been accepted for processing at node $N_3$ and queuelet C has been dissolved since there are no other messages corresponding to group C that are available for processing. Accordingly, batch key C has been removed from dispatch list register DLR. Also, at this time, message $E_4$ has arrived at the queue at the listener L. Therefore, a new queuelet with batch key E has been created. Thereafter, message $E_4$ is shown in FIG. 4g as having been added to the newly created queuelet E.

All three process flow nodes $N_2$, $N_2$, and $N_3$, are now busy and unavailable to process message $E_4$. Before placing batch key E in dispatch list register DLR to indicate to the next available node that it may process message $E_4$, the process flow nodes $N_1$, $N_2$, and $N_3$, are checked to see if any message corresponding to group E is undergoing processing. Since node $N_1$ is still processing message $E_1$, message E4 cannot be processed, even when another process flow node becomes available. That is, no two members of the same group may be processed concurrently.

Hence, batch key E is not added to the dispatch list register DLR and message $E_4$ remains in the queue.

The present invention prevents two messages corresponding to the same group from being processed in separate process flow nodes simultaneously. This prevents the occurrence of a situation, illustrated by the truck loading example, where two different process flow nodes, e.g., loaders, may be requested to process, e.g. load, two different messages, e.g., requests to load containers, for the same group, e.g., truck E, at the same time. Because the services provided at the edge between the listener L and process flow nodes $N_1$, $N_2$, and $N_3$ prevent such duplication, the programmer of the process flow nodes $N_1$, $N_2$, and $N_3$ can be assured that no two messages corresponding to the same group will arrive for processing at the same time and need not deal with such an unwanted situation in programming the process flows.

Figure 4H:
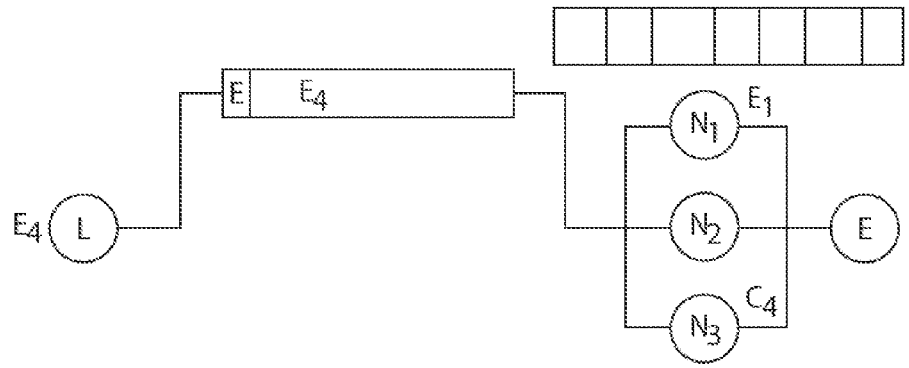

Referring now to FIG. 4H of the drawings it is seen that message $F_3$ has completed processing. Although process flow node $N_2$ is now free to accept another message for processing, the only available message is $E_4$. However, before accepting message $E_4$ process flow $N_2$ checks the dispatch list register DLR and finds no batch key indicating that a message corresponding to group E is available for processing. This is because message $E_1$ is still being processed in node N. Hence, process flow node $N_2$ will not accept a further message and will remain idle until a nonconflicting message is available for processing.

Figure 4I:
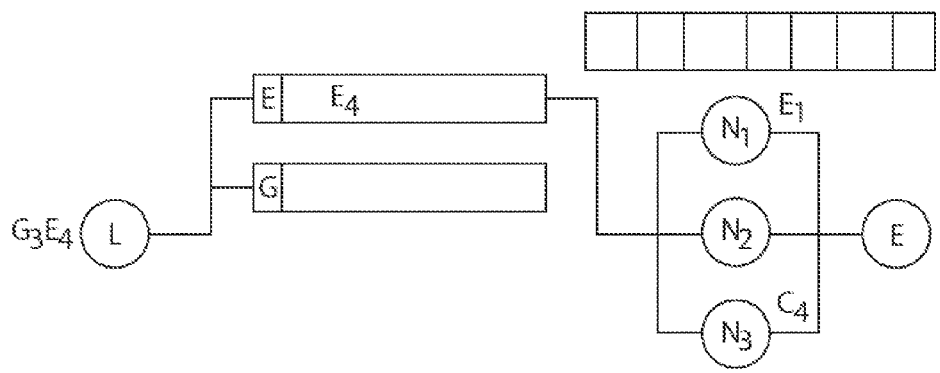

Referring to FIG. 4I, message $G_3$ has now arrived at the message queue of the listener L. Since there is no queuelet to provide a view of messages corresponding to group G an empty queuelet for group G has been constructed.

Figure 4J:
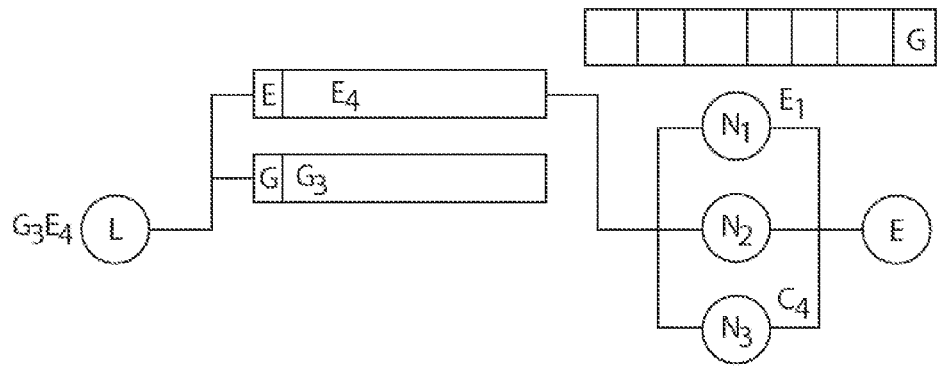

Referring now to FIG. 4J, the newly arrived message $G_3$ is included in the view of the queuelet G and batch key G is placed in the dispatch list register DLR to indicate to the process flow that a message is now ready for processing.

Figure 4K:
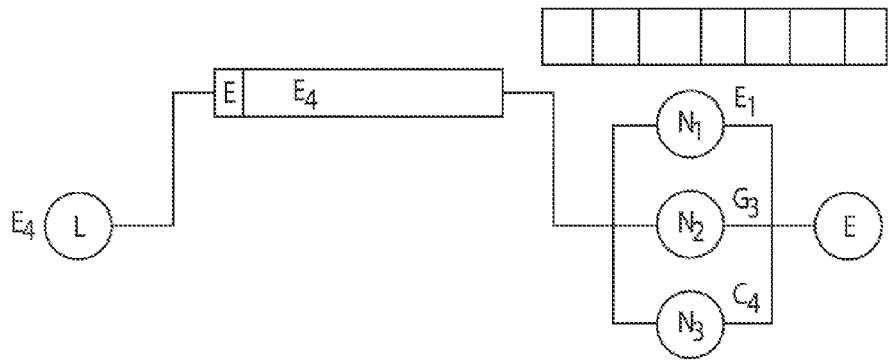

Referring now to FIG. 4K Since node $N_2$ of the process flow has been idle, node $N_2$ accepts message $G_3$ for processing. Message $G_3$ is therefore removed from the view of the queuelet G. Since there are no other messages within the view of queuelet G, queuelet G is dissolved. Meanwhile message $E_1$ is still being processed and message $E_4$ must continue to wait in the queue at the listener and remains within the view of queuelet E.

Figure 4L:
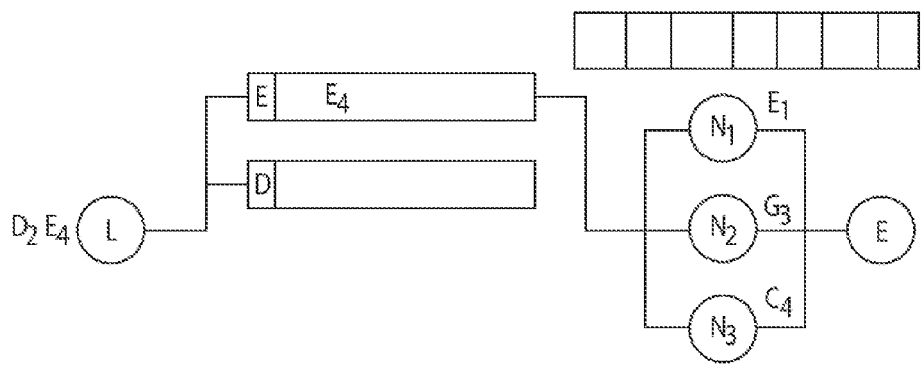

Referring further to FIG. 4L, message $D_2$ has now entered the input message queue of the listener L. Accordingly, an empty queuelet D is constructed to receive the new message. At this time message $E_4$ remains in queuelet E since there is no free process flow node; even if there were, message $E_4$ could not be processed since message $E_1$ is still in process.

Figure 4M:
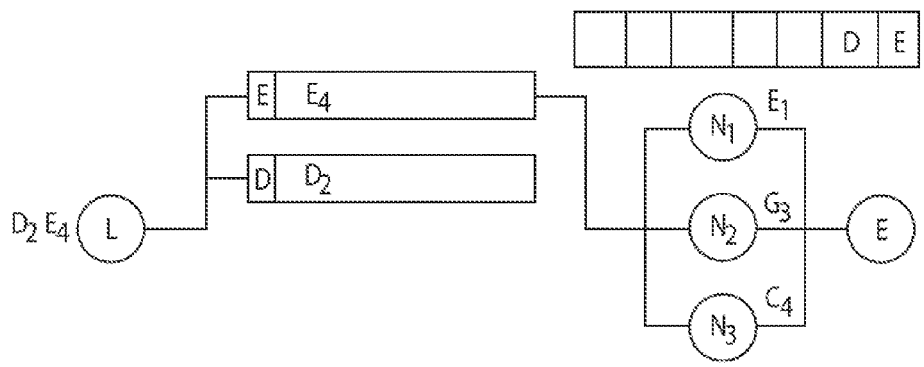

Referring next to FIG. 4M, newly arrived message $D_2$ is placed within the view of queuelet D. Moreover, the processing of message $E_1$ in node $N_1$ has now been completed. Therefore, batch key E is placed in the dispatch list register DLR to inform the process flow of the availability of a message in queuelet E. Next, batch key D is added to the dispatch list register DLR behind batch key E, this time to inform the process flow of the availability of a message within the view of queuelet D.

Figure 4N:
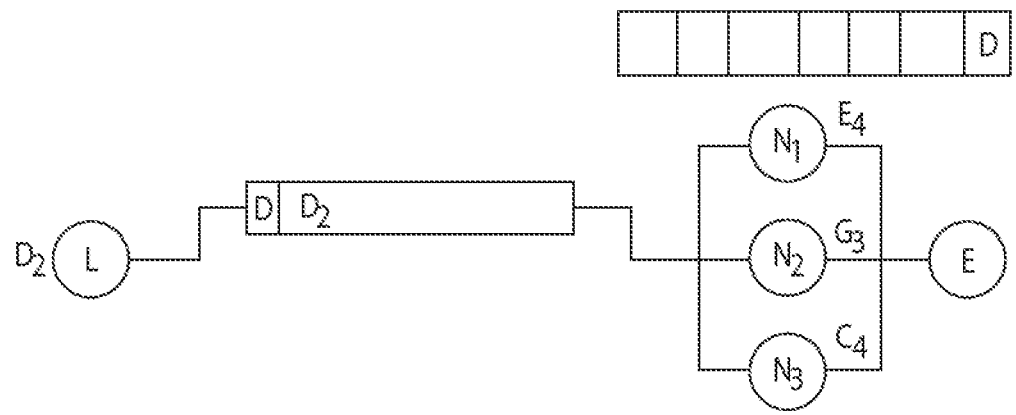

Continuing to FIG. 4N, since batch key E occupies the rightmost (first) position in the dispatch list register DLR, now available process flow node $N_1$ accepts message $E_4$ for processing and queuelet E, which contains no other messages at this time, is dissolved. Although message $D_2$ is also available for processing, it must wait for one of the process flow nodes $N_1$, $N_2$, $N_3$ to become available as all are now in use processing messages $E_4$, $G_3$, and $C_4$ respectively.

Figure 4O:
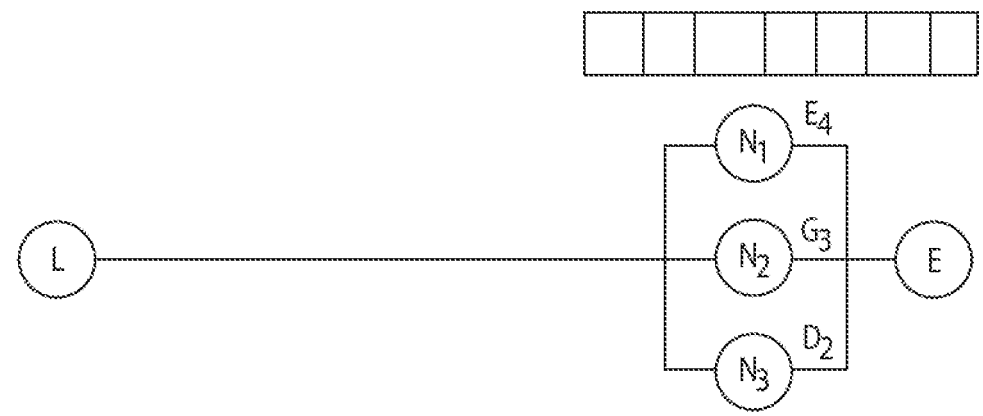

In FIG. 4O it is seen that the processing of message $C_4$ in process flow node $N_3$ has been completed. Hence message $D_2$ is accepted by process flow node $N_3$ for processing and now empty queuelet D is dissolved leaving no active queuelets.

The foregoing process continues as each subsequent message arrives in the queue at listener L until all of the messages have been processed.

As previously mentioned, the example of FIGS. 4A-4O is of an active service bus according to the invention which operates in immediate mode. That is, each message which enters the internal queue of listener L is immediately available for processing subject to two constraints. First there must be an available process flow node to process the message. Secondly, no message in the same group as the newly arrived message may presently be in process, that is, two messages from the same group may not be processed at the same time. If either one of the aforementioned conditions is not satisfied, the newly arrived message waits in the queue until there is an available process flow node and no message from the same group is in process.

Referring now to FIGS. 5A-5J, an active service bus similar to the one described with respect to FIGS. 4A-4N is described as applied to the messages received at the listener L as shown in FIG. 3. In the active service bus of FIGS. 5A-5J, operation is in batch mode and not in immediate mode as was the case with respect to FIG. 4A-O. Batch mode requires that every member of a group enter the internal queue at the listener L before any message in the group can be processed in one of the process flow nodes $N_1$, $N_2$, and $N_3$. That is, the entire batch of messages in a group must be received at the listener to ensure that they are processed in a predetermined order.

Figure 5A:
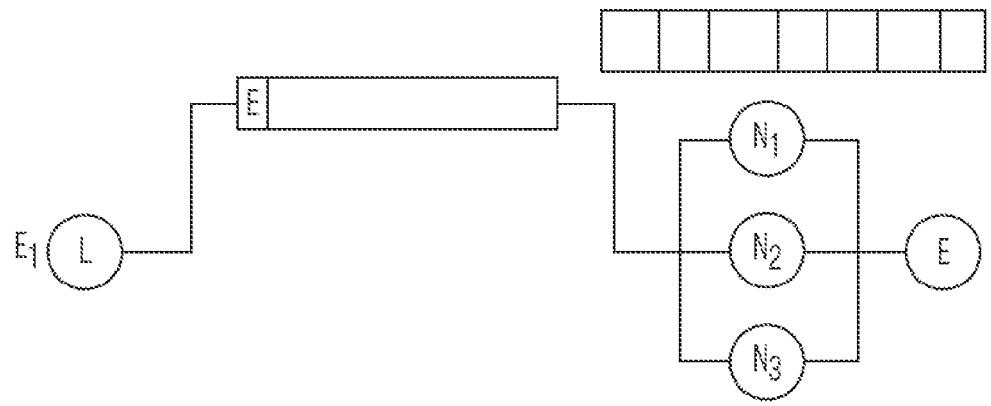
FIGS. 5A-5J are logic diagrams illustrating various sequential step of the method of FIG. 3 in accordance with a second embodiment of the invention.

Referring now to FIG. 5A, message $E_1$ has entered the queue at listener L resulting in the construction of empty queuelet E. The dispatch list register DLR is empty at this time.

Figure 5B:
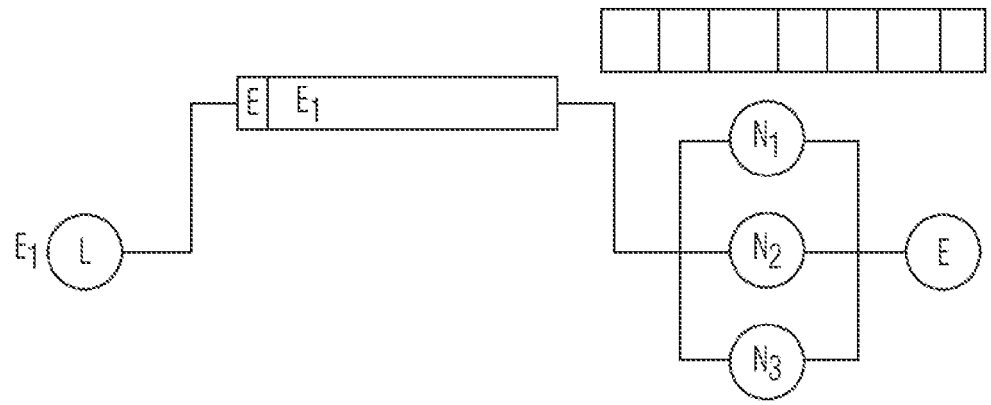

Referring now to FIG. 5B, immediately thereafter, the view of queuelet E includes newly arrived message E. However, unlike in the immediate mode example of FIGS. 4A-4N, in batch mode the dispatch list register DLR in FIG. 5B remains empty due to the absence of a full set of members of a single group in a queuelet. That is, although message $E_1$ is present, no message from queuelet E may be accepted for processing in any of the process flow nodes $N_1$, $N_2$, and $N_3$ until all of the members of group E, i.e., $E_1$, $E_2$, $E_3$, and $E_4$ have reached the internal queue at listener L and are within the view of queuelet E.

Figure 5C:
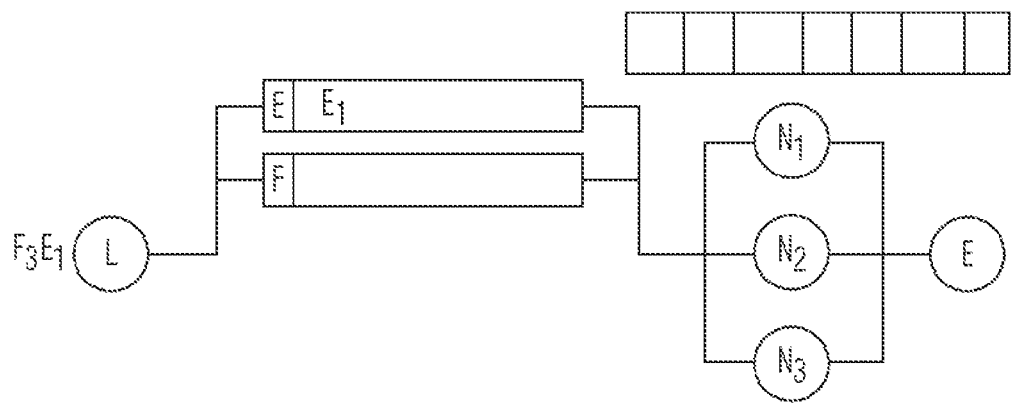

Referring now to FIG. 5C, new message $F_3$ has arrived at the internal queue and queuelet F has accordingly been constructed. The dispatch list register DLR remains empty and the process flow nodes $N_1$, $N_2$, and $N_3$ remain idle.

Figure 5D:
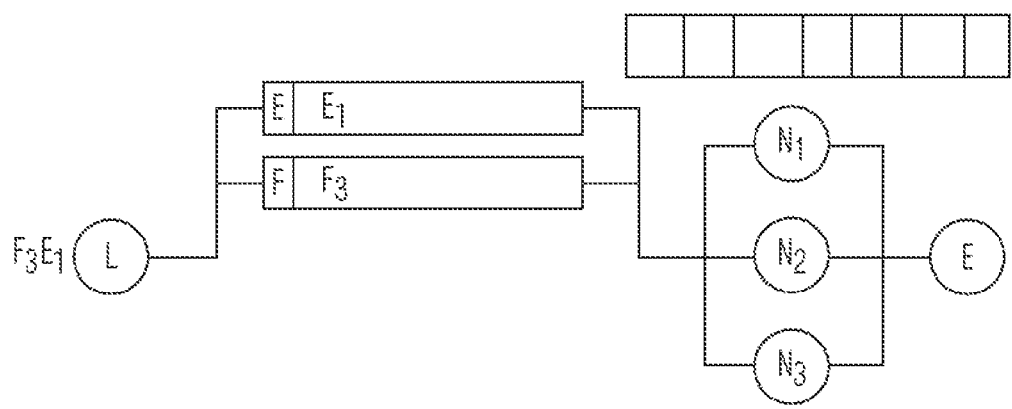

In FIG. 5D it is seen that message $F_3$ has entered the view of queuelet F. All process flows are still idle and there is no indication of an available group for processing in the dispatch list register DLR.

Figure 5E:
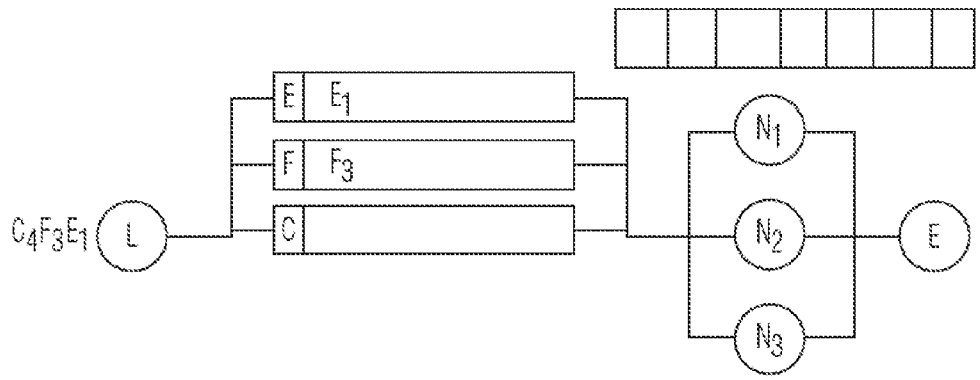

In FIG. 5E new message $C_4$ has arrived and queuelet C is therefore constructed. Still no message is available for processing.

Figure 5F:
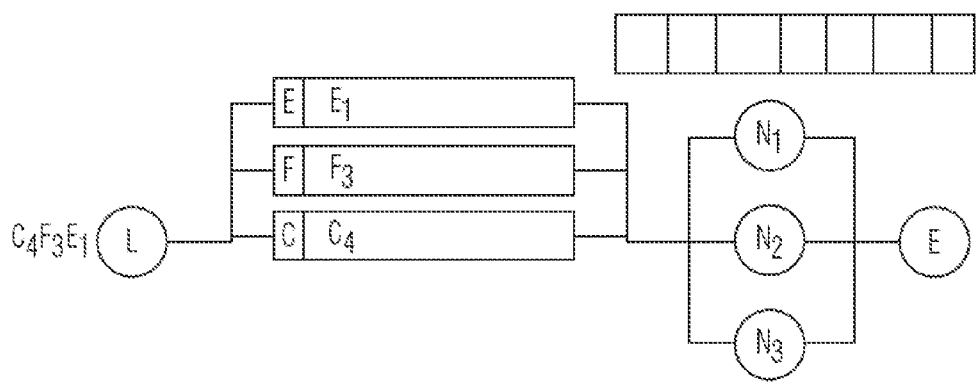

In FIG. 5F message $C_4$ has entered the view of queuelet C.

Figure 5G:
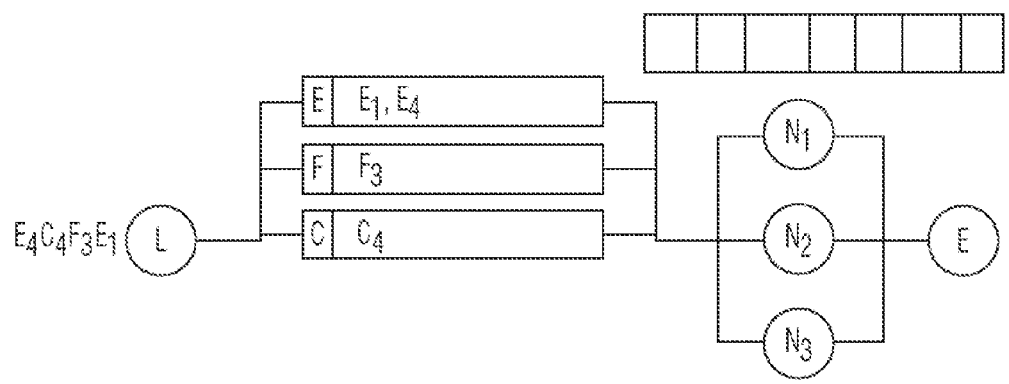

Referring to FIG. 5G, message $E_4$ has arrived and entered the view of existing queuelet E so that messages $E_1$ and $E_4$ are now within the view of queuelet E.

Figure 5H:
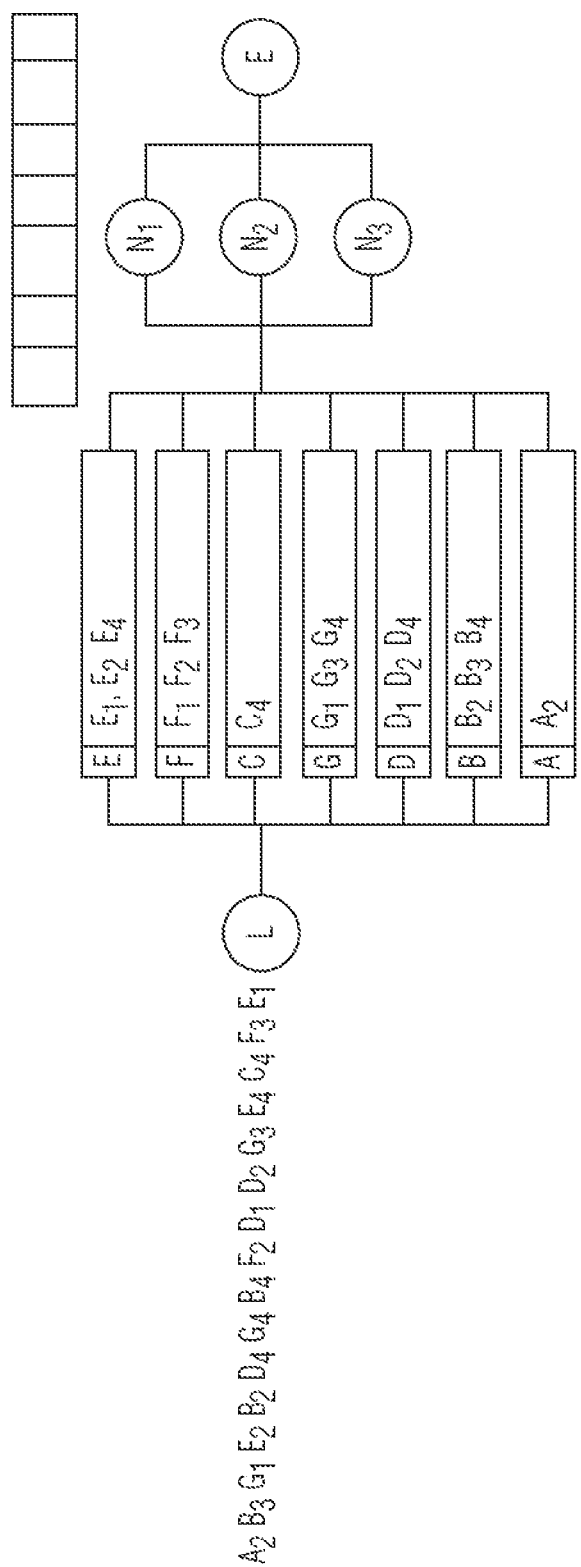
Figure 5T:
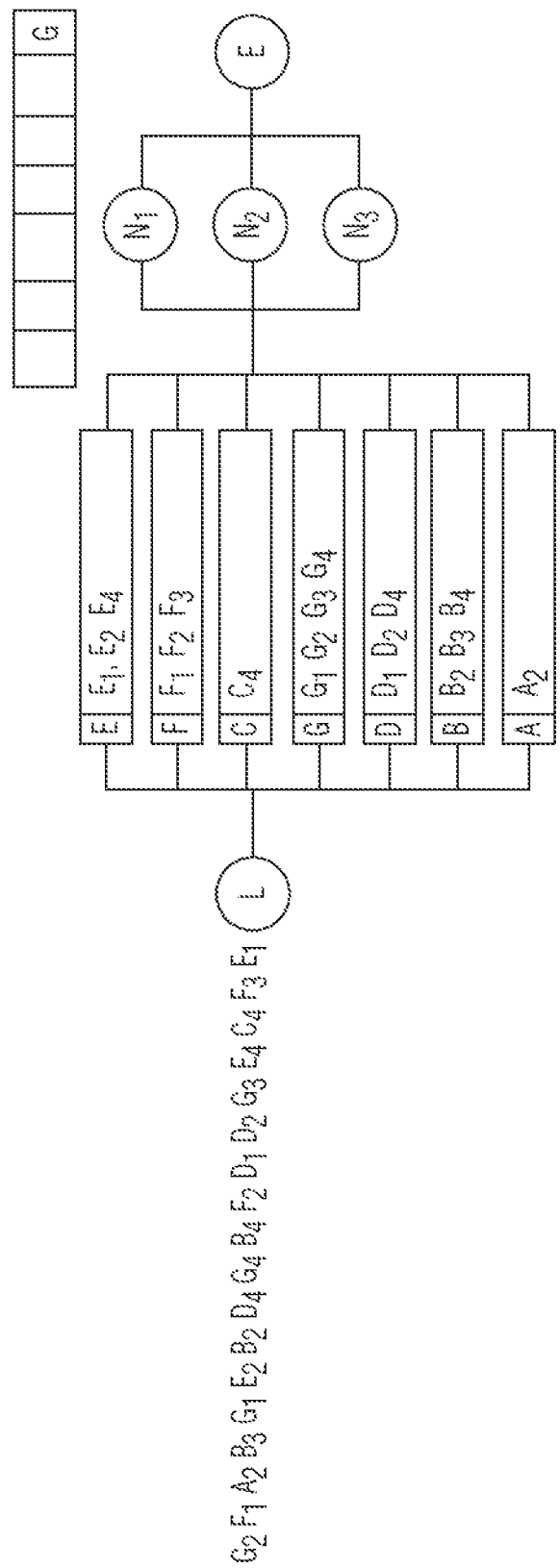

Messages continue to be received and assigned to the views of corresponding queuelets until message $A_2$ has entered the internal queue as shown in FIG. 5H. There now exists a queuelet for each group. Still, no queuelet has within its view the four messages required for a complete set of messages. Hence the dispatch list register remains empty and the process flow nodes $N_1$, $N_2$, and $N_3$ remain idle.

Referring now to FIG. 5I, messages $G_2$ and $F_1$ have now entered the internal queue of the listener L. Queuelets corresponding to the newly received messages of groups G, D, B, and A, i.e., having batch keys G, D, B, and A have previously been constructed and the received messages have been assigned to the respective views of the queuelets.

Since queuelet G is already in existence, message $G_2$ has been added to the view of queuelet G. Moreover, it will be seen that queuelet G now has within its view all of the members of group G i.e., $G_1$, $G_2$, $G_3$, and $G_4$. Accordingly, batch key G is entered into the dispatch list register DLR to indicate that the messages within the view of the queuelet G are ready for processing. Moreover, the logic embedded in the edge between the listener L and process flow nodes $N_1$, $N_2$, and N3 sorts the messages in the view of each queuelet so that the messages in queuelet G are sorted. That is, queuelet G contains an ordered view of a subqueue of the messages received at the listener L containing only messages corresponding to group G in the order $G_1$, $G_2$, $G_3$, $G_4$.

Figure 5J:
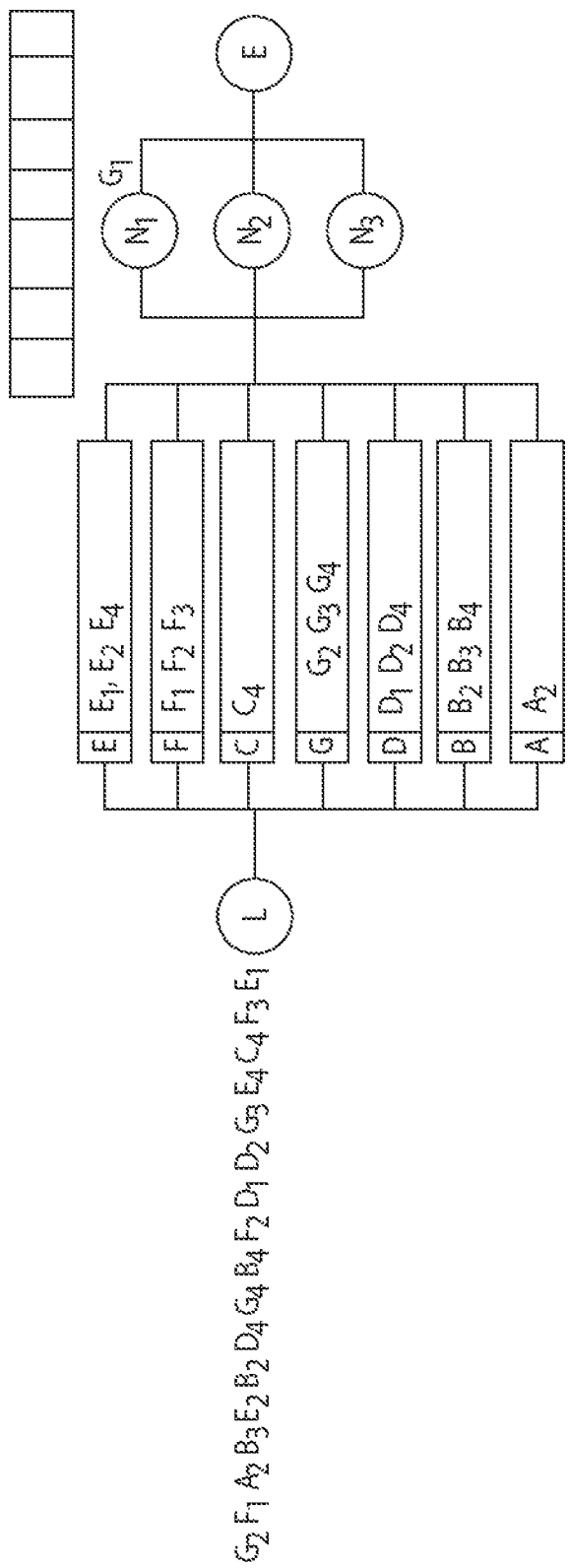

Referring now to FIG. 5J, message $G_1$, the first of the messages in the order of the view of queuelet G has been accepted by the process flow node $N_1$ for processing. Since simultaneous processing of two messages from the same group is not permitted, batch key G in the dispatch list register DLR is removed so that neither process flow node $N_2$ nor node $N_3$ will accept a further message from the view of queuelet G until processing of message $G_1$ has been completed.

Thereafter batch key G would be added to the dispatch list register DLR as would the batch keys for the other groups as the fourth and last member of each message group arrives at the internal queue at listener L. Eventually, all of the messages in the internal queue shown in FIG. 3 will arrive and be assigned to the views of the queuelets that correspond respectively to each group. As each queuelet is filled with all the members of the group, its batch key is entered into the dispatch list register DLR and each available process flow node $N_1$, $N_2$, $N_3$ will accept the next message in the view of the queuelet having the rightmost (first) batch key in the dispatch list register DLR.

Of course, while any one message is being processed in any of the nodes $N_1$, $N_2$, $N_3$, no other message from its group can be processed. Hence, while each message is being processed, its corresponding dispatch token is removed from the dispatch list register DLR.

The queuelet batch keys in the dispatch register are always shifted to the right upon removal of a batch key from the rightmost position in the register. This enables processing of messages from the various groups without favoring the earliest groups to have all of their messages received.

The dispatch list register DLR ensures that no two messages belonging to the same group are processed concurrently. A dispatch token corresponding to a queuelet is added to the dispatch list register only when two conditions are present.

First, there must be a message in the queuelet ready for processing. That is, in immediate mode there must be a message in the queuelet. In batch mode, all of the messages in the group to which a queuelet corresponds must have entered the queuelet.

Second, there must be no other member of a group undergoing processing in a process flow node before a token corresponding to the group can be placed in the dispatch list register.

Whenever a node is or becomes free for processing a message, it checks the rightmost position in the dispatch list register DLR for an entry. If an entry is present, the node accepts the next message in the queuelet corresponding to the group for processing. At the same time, the token corresponding to the group is removed from the dispatch list register DLR and all other tokens in the dispatch list register DLR are shifted to the right.

When a member message of a group completes processing in a node, and another message in the group is ready for processing, a new token for the group is entered into the dispatch list register DLR behind (to the left of) all tokens presently in the dispatch list register DLR.

Without the dispatch list register DLR, the process flow nodes could check the queuelets sequentially. However in that case, the queuelets near the beginning of the sequence that received all messages of the group within their views, that is, the queuelets that first received a single message, would be favored over the queuelets later in the sequence. In the truck loading example, the trucks for which a container was first received, would be completely loaded while other trucks for which all containers had been received, but for which the first container was received later than the first containers for other trucks, would remain empty until the trucks at the beginning of the sequence of queuelets were fully loaded.

Use of the dispatch list register DLR ensures that all groups that have received a complete batch of messages are processed substantially concurrently. e.g., loading of all trucks takes place at the same time provided all of their containers have arrived on the conveyor.

Of course if there are more groups than there are nodes to process the messages of the groups, not every group will have a message being processed simultaneously. However, during the total processing time for the messages of all of the groups, messages from each group will be processed without any group having to await the processing of all messages belonging to another group.

Irrespective of whether immediate mode or batch mode is employed, messages are processed efficiently without the programmer of the process flow having to be concerned with the order in which the messages are received.

It is to be appreciated that although a multi-thread system has been illustrated, in the cases of both the immediate mode and batch mode processing, a single thread process flow may be used in accordance with the invention. In the case of a single flow process node there is no concern about two messages being processed simultaneously as only one message at a time may be processed in the single thread. In immediate mode, with a single thread system, each message is assigned to the single thread of the process flow as soon as the process flow becomes available. In batch mode, the messages are held on the internal queue and kept within the views of their respective queuelets until each queuelet view is filled with all of the messages of a group. Thereafter the messages are dispatched to the single process flow. The dispatch list register DLR ensures that messages from each group are processed substantially concurrently without any particular group being favored.

What is claimed is:

1. A method of responding to random service request messages received on an enterprise service bus of a computer network, each of said messages being a member of a group of related messages, comprising,
    constructing at least one channel having a listener for detecting said messages, a process flow adapted to perform a process on up to n of said messages simultaneously, a first edge logically connecting said listener to said process flow for conducting each message from said listener to said process flow, an emitter for transmitting each processed message to another channel or an output device, and a second edge for conducting processed messages from said process flow to said emitter,
    storing said messages in a queue on said enterprise service bus, said listener serially detecting each of said messages upon its arrival in said queue, and performing the following sequence of steps,
    a) whenever said process flow is processing fewer than n messages, designating a message in said queue as a candidate message,
    b) determining whether the group of which said candidate message is a member has another member message being processed in said process flow,
    c) if the group of which said candidate message is a member has another member message being processed in said process flow, deferring processing of said candidate message and making a next message in said queue the candidate message and beginning said sequence of steps with a),
    d) if the group of which said candidate message is a member has no other member message being processed in said process flow, accepting said candidate message as an accepted message for processing in said process flow, and upon completion of the processing of said accepted message, transmitting said processed accepted message on said second edge to said emitter for transmission to said another channel or output device and,
    e) repeating steps a-d while said queue is not empty.

2. A method according to claim 1 comprising constructing said process flow with n nodes each of which is adapted to perform a like process on messages that it accepts, and performing steps a-d whenever one of said nodes is free to process a message.

3. A method according to claim 2 further comprising,
    as each message is detected by said listener, creating a queuelet for the group of which said detected message is a member only if there does not already exist a queuelet for viewing the messages of said group, said queuelet providing a filtered view of said queue containing only the messages in said queue which are members of the group to which the detected message belongs, and adding said detected message to the view of the queuelet for said group.

4. A method according to claim 3 further comprising, for each message in a queuelet for a group having no other message in said process flow, loading a dispatch list register with a batch key corresponding to the message group of said queuelet, the acceptance of said candidate message for processing being responsive to the presence of said batch key in said queuelet.

5. A method according to claim 4 further comprising, upon acceptance of the last remaining message in a queuelet for processing by a node, dissolving said queuelet.

6. A method according to claim 4 further comprising deleting said batch key from said dispatch list register after entry of said message into said process flow.

7. A method according to claim 2 further comprising determining whether all of the messages of a group are present in a queuelet for said group before performing step a and performing steps a-e only if all of the messages of a group are present in said queuelet for said group.

8. A method according to claim 7 further comprising sorting the messages within a queuelet which includes said candidate message before performing step d.

9. A method of responding to random service request messages received on an enterprise service bus of a computer network, each of said messages being a member of a group of related messages, comprising,
    constructing at least one channel comprising a listener for detecting said messages, a process flow comprising a plurality of parallel nodes each of which is adapted to perform a like process on messages that it accepts, a first edge logically connecting said listener to said plurality of nodes for conducting each message from said listener to one of said nodes, an emitter for transmitting each of said processed messages to another channel or an output device, and a second edge for conducting messages from said nodes to said emitter, storing said messages on a queue on said enterprise service bus, said listener serially receiving each of said messages on said queue and distributing each of said messages to said process flow when accepted by one of said nodes, as each message is detected by said listener, creating on said first edge a queuelet for providing a filtered view of said queue containing only the messages in said queue which belong to the group to which the detected message belongs, only if there does not already exist on said first edge, a queuelet for said group, adding said detected message to the view of said queuelet, whenever a node is free to accept a message for processing, determining whether any of the other nodes is currently processing a message belonging to a group for which a queuelet has been created, only if no node is currently processing a message belonging to a group for which a queuelet has been created, loading a dispatch list register with a batch key corresponding to said group for which a queuelet has been created for indicating the presence of a message on said queue belonging to said group ready for processing, causing said free node to accept said message on said queue belonging to said group ready for processing in response to the presence of said batch key corresponding to said group in said dispatch list register.

10. A method according to claim 9 further comprising, upon acceptance of the last presently remaining message in a queuelet for processing by a node, dissolving said queuelet.

11. A method according to claim 9 further comprising after acceptance of a message, deleting said batch key from said dispatch list register.

12. A method according to claim 9 further comprising determining that all of the messages of a group are present in a queuelet for said group before processing a message belonging to said group.

13. A method according to claim 12 further comprising sorting the messages within a group and processing the messages in said group in sorted order.

14. A method of responding to random service request messages received on an enterprise service bus of a computer network, each of said messages being a member of a group of related messages, comprising, constructing at least one channel comprising a listener for detecting said messages, a process flow adapted to perform a process on each of said messages, a first edge logically connecting said listener to said process flow for conducting each message from said listener to said process flow, an emitter for transmitting each processed message to another channel or an output device, and a second edge for conducting processed messages from said process flow to said emitter, for each group of a received message having no other message presently in the process flow, creating a batch key corresponding to said group, whenever said process flow is free to process a message, accepting a candidate message from the group corresponding to said batch key for processing in said process flow, and upon completion of the processing of said message, transmitting said processed candidate message on said second edge to said emitter for transmission to said another channel or output device, and accepting a next candidate message in said queue for processing until said queue is empty.

15. A method according to claim 14, further comprising, creating said batch key only after all of the messages of the group to which said candidate message belongs have arrived in said queue.

16. A method according to claim 15 further comprising sorting the messages within said group and accepting said messages for processing in sorted order.

* * * * *